March 5, 1940.  T. B. HETZEL ET AL  2,192,863
ELECTRONIC INDICATOR FOR INVESTIGATING
IMPULSES, VIBRATIONS, AND THE LIKE
Filed March 12, 1937  2 Sheets-Sheet 1

Inventor
T. B. Hetzel and
P. H. Schweitzer

By A. D. Adams
Attorney

Patented Mar. 5, 1940

2,192,863

UNITED STATES PATENT OFFICE 2,192,863

ELECTRONIC INDICATOR FOR INVESTIGATING IMPULSES, VIBRATIONS, AND THE LIKE

Theodore B. Hetzel, Haverford, and Paul H. Schweitzer, State College, Pa., assignors to Pennsylvania Research Corporation, State College, Pa., a corporation of Pennsylvania Application March 12, 1937, Serial No. 130,610

5 Claims. (Cl. 177—311)

This invention relates to electrical indicating apparatus especially designed to investigate jerky motions, impulses, vibrations and the like and, among other objects, aims to provide a greatly improved, sensitive and reliable instrument adapted to be used to determine the ignition lag and, hence, the quality of fuels used in internal combustion engines, especially of the Diesel type. However, it is to be understood that the instrument is adapted for many other practical uses, such as determining the presence or the relative magnitude of jerky or bouncing motions or impulses, the timing of such motions or impulses, or determining the instant at which a motion or impulse of a certain magnitude occurs. The main idea is to provide an improved combination of a pick-up element which transforms a mechanical impulse into electromotive force; an adjustable electronic trip relay which operates when it is subjected to an electromotive force of a predetermined magnitude to release a signal operating electromotive force; and a signaling element which transforms the impulse from the relay into a signal or suitable indication.

Other aims and advantages of the invention will appear in the specification, when considered in connection with the accompanying drawings, wherein.

Referring particularly to the drawings, the instrument there shown embodies generally a pick-up device, an adjustable electronic trip relay and a signal operated by the relay. It may be distinguished from the well known types of oscillographs, vibration meters and the like in that it employs a pick-up device which will instantly convert a mechanical motion or impulse into electromotive force and an electronic "trip" relay operating to deliver a signal operating E. M. F. to a signal or indicator when the E. M. F. received from the pick-up device reaches a predetermined magnitude for which the relay is previously adjusted. The mechanism is designed primarily to investigate the timing and/or rate of displacement of the pick-up member caused by a motion or impulse as distinguished from the extent of such motion or impulse, which is usually obtained by an oscillograph or vibration meter. In other words, the present instrument is designed to detect the presence or occurrence of impulses or vibrations of predetermined intensities and to measure the time or interval between recurring impulses or in relation to some fixed event. While such an instrument has many practical applications in the investigation of jerky motions and impulses or vibrations, it is to be borne in mind that it is one of the primary objects of the invention to provide reliable and accurate apparatus to determine ignition lag of fuels used in engines of the Diesel type.

Figure 1:
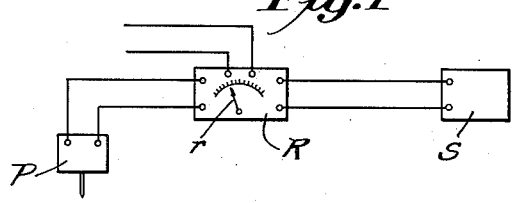
Fig. 1 is a diagrammatic illustration of a simplified form of the invention adapted to determine the presence of jerky motions or impulses of a predetermined magnitude.

In Fig. 1, there is shown a simple design of instrument adapted to detect the presence of jerky motions or impulses of a predetermined magnitude, such as vibrations produced by moving objects, machines and the like or by changes in pressure produced by impact or by an explosion. In this instance, the instrument is shown as employing a pick-up device P having a stylus or needle to transmit an impulse to the responding element. The pick-up device may be of the well known electro-magnetic, resistance, capacitance, impedance or piezoelectric type, the electro-magnetic type being selected for the purpose of illustration. It creates an E. M. F. which is transmitted to an electronic "trip" relay R, energy for the operation of which is supplied from a suitable source of electric power. This relay may be of the vacuum, gas or vapor-filled grid-controlled type, the vapor-filled type of "Thyratron" tube being selected for the purpose of illustration. The relay is adjustable to respond to E. M. F.'s and, hence, impulses of a predetermined magnitude by means of a potentiometer or variable resistor element $r$ in the relay circuit. The increased electrical impulses created by the relay are delivered to a suitable indicator or signal S, preferably of the visible type, such as a spark discharge, a neon tube, or other type of gaseous-discharge glow lamp, the latter type being selected for the purpose of illustration.

Figure 6:
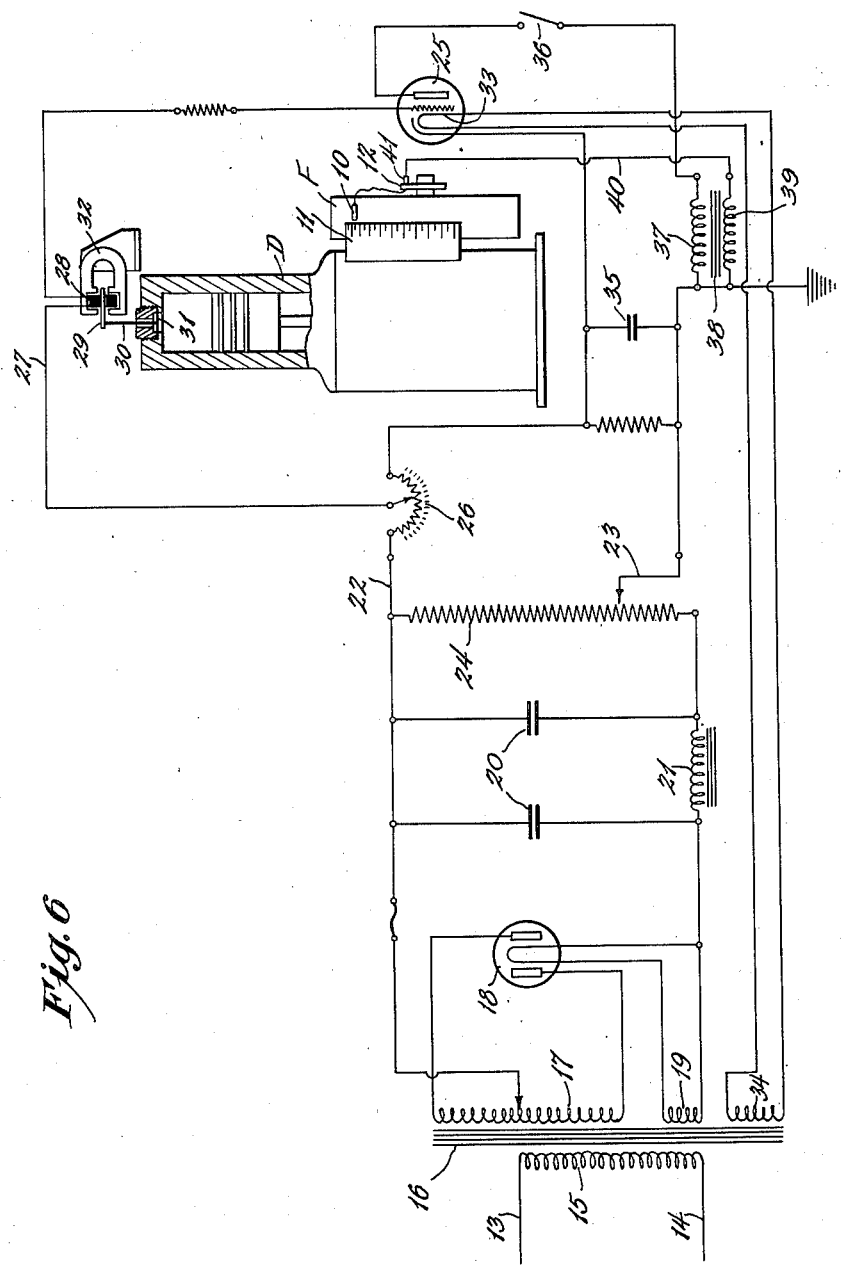
Fig. 6 is a wiring diagram of the simplest form of the invention embodying only one set of the principal units and applied for illustrative purposes to a Diesel engine to measure ignition lag.

The details of a pick-up relay and indicator or signal are illustrated in Fig. 6 and will be hereinafter described.

Figure 2:
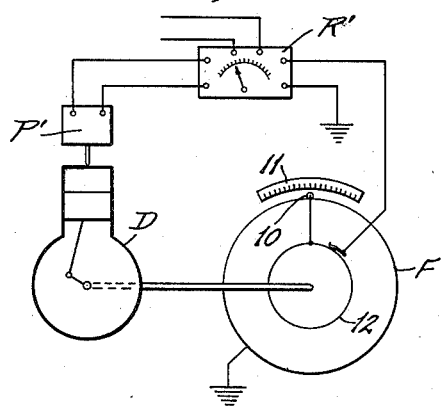
Fig. 2 is a similar view of another form of the invention adapted to determine both the presence and the timing of such motions or impulses.

In Fig. 2 there is shown a form of the instrument designed to indicate the occurrence and timing of impulses or vibrations, being applied to a Diesel engine for the purpose of illustration. However, it may be used to detect and time recurring impulses or vibrations produced in various ways. In this instance, the pick-up $P_1$ is actuated by ignition impulses from the cylinder head of a Diesel engine D to which is connected a synchronous rotating member, such as the flywheel F. The indicator or signal, in this example, is in the form of a neon glow lamp 10 suitably secured to the flywheel and cooperating with a stationary graduated index plate or scale 11 to provide a protractor. Current from the relay $R_1$, to operate the lamp, is supplied through an ordinary slip-ring 12 as clearly shown. The arrangement is such that the lamp will flash the instant ignition of the fuel in the engine begins and the flash will be repeated for each cycle. The speed of rotation is such that the lamp will appear to be stationary opposite a fixed point on the scale or index 11. The stroboscopic protractor reading on the scale will determine the position or time of the explosions with reference to the crank angle. Since the crank angle at which injection of the fuel takes place is known, the reading also represents the ignition lag. This quantity is a measure of the quality or anti-knock value of the fuel which is directly related to what is known as the cetane number. Thus, the proper fuel for a given engine or, conversely, the proper engine design for a given fuel may be selected.

Figure 3:
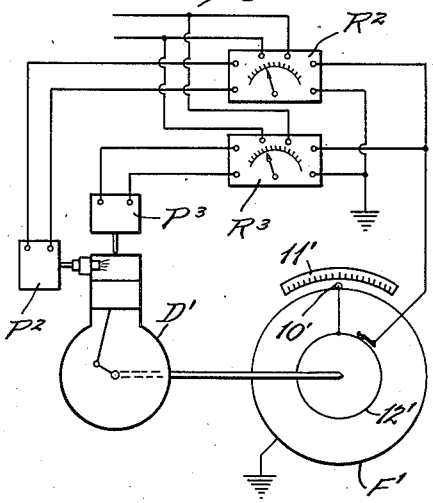
Fig. 3 is a similar view of another form of the invention adapted to measure the elapsed time between successive coordinated events or impulses and shown as being applied to a Diesel engine to determine fuel ignition lag.

In Fig. 3, there is shown a form of instrument designed to measure the elasped time between successive, coordinated or related impulses resulting from events, at least one of the impulses being of a predetermined magnitude. It is also shown as being applied to a Diesel engine $D_1$ adapted to measure the elapsed time or interval between injection and ignition, but it will be understood that it is capable of being employed to measure intervals between related successive impulses produced in other ways. In this example, two electro-magnetic pick-ups $P_2$ and $P_3$ are connected to the fuel nozzle and the cylinder head, respectively, of the engine. The pick-up $P_2$ is adapted to receive its impulse from the valve in the fuel nozzle as it opens. Two relays $R_2$ and $R_3$ are shown as being connected in circuit with the respective pick-ups and a single neon lamp 10' mounted on fly-wheel $F_1$ is shown as being connected to both relays so that it will flash successively according to the time lag between electrical impulses delivered from the relays. Thus, the lamp will appear to occupy two positions on the protractor scale or index member 11' and the difference between the readings will determine directly the ignition lag in terms of the crank angle.

The apparatus shown in Fig. 3 is capable of some obvious modifications. For example, a single relay may be used to serve the purpose of both relays by employing suitable manual or automatic switch means whereby the successive impulses from the pick-ups are delivered alternately to the relay. Obviously, the delivered E. M. F.'s must be equalized in such an arrangement.

Figure 4:
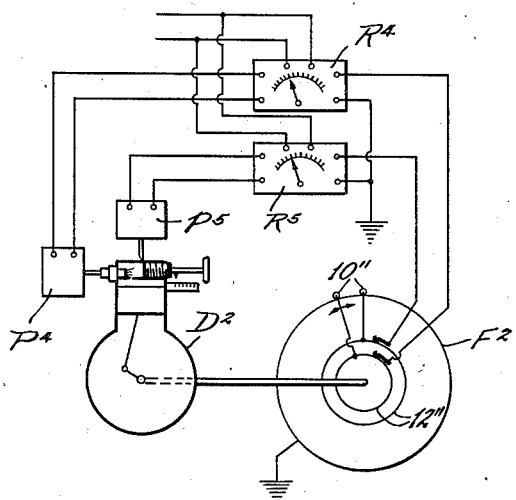
Fig. 4 is a similar view of still another form of the invention for determining ignition lag of fuel in a standard fuel testing Diesel engine.
Figure 5:
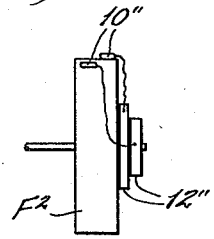
Fig. 5 is a diagrammatic detail view of signal elements embodied in Fig. 4.

In Fig. 4, there is shown still another embodiment of the invention primarily applicable to the investigation of fuels used in Diesel engines. In this instance, two electro-magnetic pick-ups $P_4$ and $P_5$ and two relays $R_4$ and $R_5$ are also employed. However, separate neon lamps 10'' on the fly-wheel $F_2$ are connected through a pair of slip rings 12'' to the respective relays. These lamps are mounted for relative angular adjustment on the fly-wheel and are offset from each other in the direction of the axis of rotation a distance approximately equal to the length of one lamp (Fig. 5), so that the flashes will appear to be adjacent to each other. In this case, the angular displacement of the lamps on the wheel is adjusted to correspond with a desired or known ignition lag. For example, this angle may be of such value that all types of fuels may be rated in the same test engine without change. Incidentally, the test engine is perferably of the type known as a Cooperative Fuel Research (C. F. R.) Diesel engine having an adjustable plug in the cylinder head for varying the compression ratio. Now, for different fuels, the compression ratio is varied to make the lamp flashes coincide or aline axially with each other, thus producing the same or a fixed ignition lag for all fuels. Then, the cetane number is determined directly from the compression ratio. It is well known that a fuel of low cetane number requires a high compression ratio for ignition at a definite ignition lag.

As explained in connection with Fig. 3, the apparatus shown in Fig. 4 is also capable of obvious modifications. A single relay may likewise be substituted for the two relays by employing ordinary switch means and equalizing the electrical impulses from the pick-ups.

Fig. 6 is a wiring diagram of one of the simplest forms of the instrument and disclosing the preferred circuits of an electro-magnetic pick-up and an electronic trip relay employed in the other figures. The circuit happens to agree with the embodiment illustrated in Fig. 2. In the diagram, the electronic relay is shown as comprising two major units, the electron tube and its associated parts and a power supply unit. While the power for operation of the relay may be supplied from any suitable source of current, it is shown for the purpose of illustration as being derived from the usual source of alternating current so that the apparatus may be connected to an ordinary lighting or power circuit. In this instance, alternating current is supplied by conductors 13, 14 to the primary winding 15 of a transformer 16. A high voltage, secondary winding 17 is connected in the usual manner to the plates of a rectifier tube 18. Current to heat the cathode of the rectifier tube is supplied by another secondary winding 19. The high voltage direct current from the rectifier is shown as being filtered by means of condensers 20 and an inductance 21, thereby delivering uniform direct current at high voltage through conductors 22, 23 to the relay. A variable resistor 24 serves as a convenient means to control this voltage.

The electron tube unit is shown as including an electron tube 25 adapted to conduct when the voltage impressed on its grid reaches the critical value. A "Thyratron" tube is well suited for this purpose, since it is filled with mercury vapor and will, therefore, carry a heavy current. The tube is so connected in the circuit that it is normally in a non-conducting state because of a potentiometer 26 which is adjusted to maintain a sufficiently negative bias on the grid to prevent the tube from conducting normally. A conductor 27, which leads through a pick-up coil 28, connects the potentiometer 26 to the electron tube 25. This constitutes a series connection whereby the algebraic sum of the steady potential from the potentiometer and the E.M.F. produced by the pick-up is always applied to the grid of the electron tube.

The pick-up is shown as comprising the coil 28 having an armature 29 rigidly connected to the stylus 30 which is actuated in the well known manner by a diaphragm 31 in the head of the engine. A horseshoe magnet 32 acts as a source of magnetic flux for the coil. Movement of the armature causes the conductors of the coil to cut the magnetic lines of force, generating an E. M. F. in the coil which varies the potential on the grid. The pick-up is so sensitive that the diaphragm may be dispensed with entirely. Mere contact between the cylinder head and the stylus is sufficient. Whenever the potential of the grid is sufficiently reduced, the tube is caused to conduct current from the cathode to the plate. Incidentally, this cathode is caused to emit electrons upon being heated by a heater 33 supplied with current from a suitable source, such as a secondary winding 34 of the transformer 16. The plate current consists chiefly of the charge which has been stored in a condenser 35 by the power current through conductors 22, 23 and the potentiometer 26. The condenser charge is thus conducted through a switch 36 and through the primary winding 37 of a spark coil 38; thence, back to the condenser and power circuit. Thus, whenever the E. M. F. from the pick-up exceeds the predetermined value for which the potentiometer is set, the Thyratron instantly becomes a conductor or acts as a circuit closing switch to release the stored charge in condenser 35 through the primary winding 37 of spark coil 38.

The voltage from a secondary 39 of the spark coil is applied through a conductor 40 to a brush 41 on the slip-ring 12 which is connected to the neon lamp 10 as described in connection with Fig. 2. It can readily be understood that by varying the steady potential applied to the grid of the electron tube, the sensitivity of the relay can be changed at will. Thus, the magnitude of the E. M. F. generated by the pick-up may be made the controlling factor. By a slight adjustment of the potentiometer the lamp may be caused to glow or not to glow for impulses of a given magnitude. Hence, the trip relay serves as an adjustable trigger which instantaneously releases stored energy from the condenser in response to pick-up impulses exceeding a predetermined magnitude, and excludes all impulses of less magnitude. The signal is of flash duration and is not affected by the duration of the pick-up impulse. In this manner, impulses of a given magnitude may be both detected and compared. Incidentally, the potentiometer scale may be empirically calibrated to measure the magnitude of impulses when the flash just disappears.

From the foregoing description, it will be seen that instruments of this type are very accurate and dependable in operation. As fuel testers for Diesel engines, they have many obvious and important advantages over the known devices which embody bouncing pins, oscillographs and the like. Moreover, the present instruments may be used advantageously to rate fuels used in ordinary spark ignition engines in terms of their octane number. Simple forms of the instruments may be used to test the fuel injection in Diesel spray nozzles to determine whether injection has taken place at any speed. They may be used as vibration meters to determine the severity or magnitude of vibratitons of machinery, foundations, ships, airplanes, all kinds of vehicles and the like. It is contemplated that they may serve as ride testers for road and rail vehicles. They can also be applied to the study of ballistics and many different transient phenomena too numerous to mention.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. An instrument for measuring the exact time of ignition or ignition point of fuels in an internal combustion engine comprising, in combination, pickup means for converting an initial combustion pressure impulse into an electrical impulse proportional to the rate of pressure rise; an electronic trip relay connected in circuit with said pickup means and adapted to deliver a second electrical impulse when said first electrical impulse reaches a magnitude representing a rate of pressure rise above the maximum rate of compression pressure rise, and a stroboscopic indicator operated by said second electrical impulse to measure the crank-angle displacement at which said pressure rise occurs.

2. An instrument for measuring the exact time of injection or injection point of fuels in an internal combustion engine of the fuel injection type comprising in combination, pickup means for converting the opening jerk or motion of the injector valve into an electrical impulse; an electronic trip relay connected in circuit with said pickup means and adapted to deliver a second electrical impulse when said first electrical impulse reaches a predetermined magnitude representing the maximum acceleration of the valve; and a stroboscopic indicator operated by said second electrical impulse to measure the crank-angle displacement at which said opening jerk occurs.

3. An instrument for measuring ignition lag of fuels in an internal combustion engine of the fuel injection type comprising, in combination, pickup means for converting the opening jerk of the injector valve into an electrical impulse; pickup means for converting an initial combustion impulse into an electrical impulse proportional to the rate of pressure rise; electronic trip relays connected in circuit with each of said pickup means, and adapted to deliver second electrical impulses when said first electrical impulses reach predetermined magnitudes representing the maximum acceleration of the valve and a rate of pressure rise above the maximum rate of compression pressure rise, respectively; and indicator means operated by said second electrical impulses to measure the interval between the injection and ignition points in said engine.

4. An instrument for measuring the ignition lag of fuels in an internal combustion engine of the fuel injection type comprising, in combination electro-magnetic pickups responsive to impulses created by fuel injection and ignition, respectively; electronic trip relays connected in circuit with said pickups and adapted to deliver second electrical impulses when said first electrical impulses reach predetermined magnitudes representing the maximum acceleration of the valve and a rate of pressure rise above the maximum rate of compression pressure rise, respectively;

adjustable means connected to vary the sensitivity of said relays; gaseous-discharge glow lamps connected in circuit with the respective relays and operable by said increased electrical impulses; a member connected to rotate in synchronism with the engine and carrying said lamps in adjustable angular relation to each other, whereby stroboscopic observations may be made to determine the lag.

5. An instrument for measuring the ignition lag of fuels in an internal combustion engine of the fuel injection type comprising, in combination, electro-magnetic pickups responsive to impulses created by fuel injection and ignition, respectively; electronic trip relays connected in circuit with said pickups and adapted to deliver second electrical impulses when said first electrical impulses reach predetermined magnitudes representing the maximum acceleration of the valve and a rate of pressure rise above the maximum rate of compression pressure rise, respectively; adjustable means connected to vary the sensitivity of said relays; gaseous-discharge glow lamps connected in circuit with the respective relays and operable by said increased electrical impulses; a member connected to rotate in synchronism with the engine and carrying two graduated scales for injection and ignition, respectively, stroboscopically illuminated by said glow lamps, whereby the lag may be determined.

THEODORE B. HETZEL.
PAUL H. SCHWEITZER.